United States Patent
Yano et al.

(10) Patent No.: US 8,399,090 B2
(45) Date of Patent: Mar. 19, 2013

(54) PRESSURE-SENSITIVE ADHESIVE COMPOSITION, PRESSURE-SENSITIVE ADHESIVE LAYER, PROCESS FOR PRODUCING THE PRESSURE-SENSITIVE ADHESIVE LAYER, AND OPTICAL MEMBER WITH PRESSURE-SENSITIVE ADHESIVE

(75) Inventors: Kohei Yano, Ibaraki (JP); Shinichi Inoue, Ibaraki (JP); Masayuki Satake, Ibaraki (JP); Yutaka Moroishi, Ibaraki (JP); Fumiko Nakano, Ibaraki (JP)

(73) Assignee: Nitto Denko Corporation, Obaraki-shi (JP)

( * ) Notice: Subject to any disclaimer, the term of this patent is extended or adjusted under 35 U.S.C. 154(b) by 1209 days.

(21) Appl. No.: 12/090,159
(22) PCT Filed: Oct. 17, 2006
(86) PCT No.: PCT/JP2006/320634
§ 371 (c)(1),
(2), (4) Date: Apr. 14, 2008
(87) PCT Pub. No.: WO2007/046365
PCT Pub. Date: Apr. 26, 2007

(65) Prior Publication Data
US 2009/0042004 A1    Feb. 12, 2009

(30) Foreign Application Priority Data
Oct. 18, 2005   (JP) .................. 2005-302974

(51) Int. Cl.
*B32B 7/12*    (2006.01)
*C08F 8/32*    (2006.01)
*C08F 2/46*    (2006.01)
(52) U.S. Cl. ............... 428/355 AC; 428/343; 525/123; 427/487; 427/163.1; 427/208.4
(58) Field of Classification Search .............. 428/343, 428/355 R, 355 CN, 355 AC; 525/123; 427/487, 427/163.1, 208.4
See application file for complete search history.

(56) References Cited

U.S. PATENT DOCUMENTS 6,020,408 A * 2/2000 Suzuki et al. ............. 524/265
6,310,612 B1   10/2001 Kotsubo et al.
(Continued)

FOREIGN PATENT DOCUMENTS

EP    0 926 214 A2    6/1999
JP    6-108025 A      4/1994
(Continued)

OTHER PUBLICATIONS

Translation of JP 2003-013027, Nakagawa et al., Jan. 15, 2003.*

(Continued)

*Primary Examiner* — Hai Vo
(74) *Attorney, Agent, or Firm* — Westerman, Hattori, Daniels & Adrian, LLP

(57) ABSTRACT

This invention provides a pressure-sensitive adhesive composition that exhibits excellent pressure-sensitive adhesive properties after crosslinking treatment, does not cause lifting or lifting upon heat treatment or treatment under high-humidity conditions particularly even in the case of a pressure-sensitive adhesive layer having a reduced layer thickness, and has excellent durability. A pressure-sensitive adhesive layer formed using the pressure-sensitive adhesive composition, and a process for producing the same are also provided. Further, an optical member with pressure-sensitive adhesive comprising the pressure-sensitive adhesive layer and an image display using the same are provided. The pressure-sensitive adhesive composition is characterized by comprising 100 parts by weight of an (meth)acrylic polymer and 0.02 to 2 parts by weight of a peroxide, and 0.02 to 2 parts by weight of an isocyanate crosslinking agent, the (meth)acrylic polymer comprising as monomer units 50 to 98% by weight of an (meth)acrylic monomer represented by general formula $CH_2=C(R_1)COOR_2$, wherein $R_1$ represents hydrogen or a methyl group and $R_2$ represents an alkyl group having 2 to 14 carbon atoms, and 0.1 to 35% by weight of a nitrogen-containing monomer.

12 Claims, 1 Drawing Sheet

U.S. PATENT DOCUMENTS

| | | | |
|---|---|---|---|
| 6,395,360 B1 * | 5/2002 | Takahira et al. | 428/40.1 |
| 7,846,542 B2 * | 12/2010 | Toyama et al. | 428/355 AC |
| 7,862,888 B2 * | 1/2011 | Toyama et al. | 428/354 |
| 2005/0038152 A1 * | 2/2005 | Naito et al. | 524/270 |
| 2005/0266239 A1 * | 12/2005 | Satake et al. | 428/354 |
| 2006/0188711 A1 * | 8/2006 | Kishioka et al. | 428/343 |
| 2008/0118752 A1 * | 5/2008 | Inoue et al. | 428/354 |
| 2009/0023869 A1 * | 1/2009 | Shirafuji et al. | 525/451 |

FOREIGN PATENT DOCUMENTS

| | | | |
|---|---|---|---|
| JP | 7-218719 A | 8/1995 |
| JP | 7-230006 A | 8/1995 |
| JP | 8-199134 A | 8/1996 |
| JP | 8-327821 A | 12/1996 |
| JP | 9-113724 A | 5/1997 |
| JP | 9-176603 A | 7/1997 |
| JP | 9-288214 A | 11/1997 |
| JP | 10-54906 A | 2/1998 |
| JP | 11-181382 A | 7/1999 |
| JP | 11-181383 A | 7/1999 |
| JP | 11-181384 A | 7/1999 |
| JP | 11-181385 A | 7/1999 |
| JP | 2002-338911 A | 11/2002 |
| JP | 2003-13027 A | 1/2003 |
| JP | 2003-13028 A | 1/2003 |
| JP | 2003-27019 A | 1/2003 |
| JP | 2003-329838 A | 11/2003 |
| JP | 3645005 B2 | 5/2005 |

OTHER PUBLICATIONS

International Search Report of PCT/JP2006/320634, date of mailing Nov. 21, 2006.

Notification of Transmittal of Translation of the International Preliminary Report on Patentability (Form PCT/IB/338) of International Application No. PCT/JP2006/320634 mailed Jun. 19, 2008 with Forms PCT/IB/373 and translation forms PCT/ISA/237.

Japanese Office Action mailed on Aug. 26, 2011, issued in corresponding Japanese Patent Application No. 2006-280277.

* cited by examiner

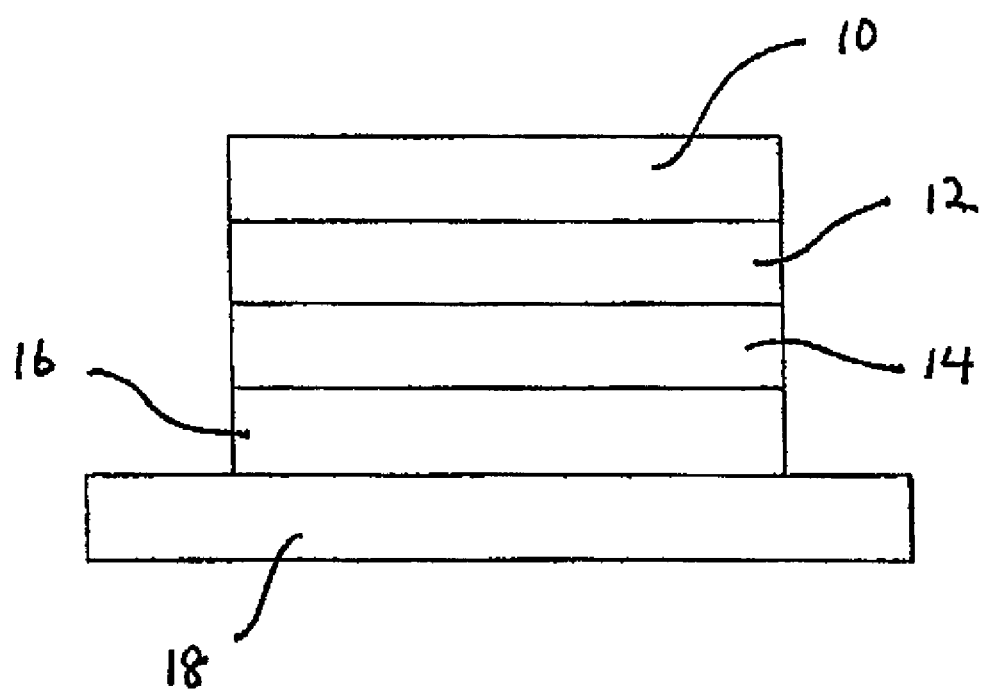

PRESSURE-SENSITIVE ADHESIVE COMPOSITION, PRESSURE-SENSITIVE ADHESIVE LAYER, PROCESS FOR PRODUCING THE PRESSURE-SENSITIVE ADHESIVE LAYER, AND OPTICAL MEMBER WITH PRESSURE-SENSITIVE ADHESIVE

TECHNICAL FIELD

The present invention relates to a pressure-sensitive adhesive composition. More specifically, the present invention relates to a pressure-sensitive adhesive composition that exhibits excellent pressure-sensitive adhesive properties after a crosslinking reaction and particularly has excellent durability even in the case of a pressure-sensitive adhesive layer having a reduced layer thickness. The present invention also relates to a pressure-sensitive adhesive layer made from the pressure-sensitive adhesive composition and to a process for producing such a pressure-sensitive adhesive layer. The present invention also relates to an optical member with pressure-sensitive adhesive having such a pressure-sensitive adhesive layer and to an image display using the same.

BACKGROUND ART

In liquid crystal displays, a retardation film is generally used in their laminated structure in order to compensate for coloration of their liquid crystal layer or to compensate for viewing angle-dependent changes in retardation. Such an optical material can significantly expand or contract under hot or humid conditions, and such expansion or contraction increases the risk of displacement, lifting or separation. Thus, pressure-sensitive adhesives are required to have durability under such conditions.

In recent years, liquid crystal displays have been reduced in thickness, and pressure-sensitive adhesive layers for use in laminating such a retardation film and the like have been required to be thin enough for a further reduction in thickness. However, such a reduction in thickness has made the durability unsatisfactory.

Up to now, for example, the techniques described below have been proposed to solve the problem of displacement or the like under hot or humid conditions.

There is disclosed a proposal to use an optical member with pressure-sensitive adhesive and an elliptically polarizing plate using the same, in which the affinity of the pressure-sensitive adhesive for both the retardation plate and the polarizing plate is taken into account (see for example Patent Literature 1).

There is disclosed another proposal to use an elliptically polarizing plate having the composition of a pressure-sensitive adhesive layer (1)/a polyvinyl alcohol retardation film/a pressure-sensitive adhesive layer (2)/a polarizing film, wherein the ratio (d1/d2) of the thickness d1 of the pressure-sensitive adhesive layer (1) to that d2 of the pressure-sensitive adhesive layer (2) is from 0.1 to 0.95 (see for example Patent Literatures 2 and 3).

There is disclosed a further proposal to use a pressure-sensitive adhesive comprising 2 to 50% by weight of an imide group-containing monomer copolymerizable with an acrylic monomer (see for example Patent Literature 4).

There is disclosed a further proposal to use an optical pressure-sensitive adhesive using 10 to 20% by weight of an amide group-containing polymerizable monomer (see for example Patent Literature 5).

There is disclosed a further proposal to use a good pressure-sensitive adhesive comprising an acrylamide derivative as a monomer component (see for example Patent Literature 6).

There is disclosed a further proposal to use a pressure-sensitive adhesive comprising, as a main component, 0.5 to 15% by weight of at least one monomer having a carboxyl or amide group and an unsaturated triple bond (see for example Patent Literature 7).

There is disclosed a further proposal to use a pressure-sensitive adhesive obtained by copolymerizing 0.1 to 10 parts by weight of an amide group-containing (meth)acrylic monomer (see for example Patent Literature 8).

There is disclosed a further proposal to use an acrylic pressure-sensitive adhesive comprising 1 to 12% by weight of N-substituted (meth)acrylamide and/or N,N-substituted (meth)acrylamide (see for example Patent Literature 9).

As described above, pressure-sensitive adhesive layers have been required to be thin enough for the display thickness reduction in recent years. However, it has been found that it is difficult for conventional techniques to provide sufficient durability at high temperature or high humidity when the thickness is reduced and that it is difficult for conventional techniques to meet the demand for the thickness reduction.

Patent Literature 1: Japanese Patent Application Laid-Open (JP-A) No. 10-54906
Patent Literature 2: JP-A No. 07-230006
Patent Literature 3: JP-A No. 07-218719
Patent Literature 4: JP-A No. 08-199134
Patent Literature 5: Japanese Patent No. 3645005
Patent Literature 6: JP-A No. 09-176603
Patent Literature 7: JP-A No. 09-113724
Patent Literature 8: JP-A No. 09-288214
Patent Literature 9: JP-A No. 2003-329838

DISCLOSURE OF INVENTION

Problems to be Solved by the Present Invention

It is therefore an object of the present invention to solve the above problem and to provide a pressure-sensitive adhesive composition that exhibits excellent pressure-sensitive adhesive properties after a crosslinking treatment and particularly has excellent durability such that it does not cause lifting or separation upon heat treatment or treatment under high-humidity conditions even in the case of a pressure-sensitive adhesive layer having a reduced layer thickness.

It is another object of the present invention to provide a pressure-sensitive adhesive layer made from the pressure-sensitive adhesive composition and to provide a process for producing the pressure-sensitive adhesive layer. It is a further object of the present invention to provide an optical member with pressure-sensitive adhesive having the pressure-sensitive adhesive layer and to provide an image display using the optical member with pressure-sensitive adhesive.

Means for Solving the Problems

In order to achieve the objects, the inventors have made intensive investigations on components for pressure-sensitive adhesive compositions. As a result, the inventors have found that a pressure-sensitive adhesive composition containing specific amounts of a (meth)acrylic polymer with a specific monomer composition, a peroxide and an isocyanate crosslinking agent can exhibit excellent pressure-sensitive adhesive properties after a crosslinking treatment and particularly have high durability such that it does not cause lifting or separation upon heat treatment or treatment under high-humidity conditions even in the case of a pressure-sensitive adhesive layer having a reduced layer thickness, so that the present invention has been completed.

Thus, the present invention is directed to a pressure-sensitive adhesive composition, comprising: 100 parts by weight of a (meth)acrylic polymer including as monomer units 50 to 98% by weight of a (meth)acrylic monomer represented by general formula $CH_2=C(R_1)COOR_2$, wherein $R_1$ is hydrogen or a methyl group, and $R_2$ is an alkyl group having 2 to 14 carbon atoms, and 0.1 to 35% by weight of a nitrogen-containing monomer; 0.02 to 2 parts by weight of a peroxide; and 0.02 to 2 parts by weight of an isocyanate crosslinking agent.

As is evident from the results of the examples described later, the pressure-sensitive adhesive composition containing a (meth)acrylic polymer with a specific monomer composition, specific amounts of an isocyanate crosslinking agent and a peroxide, according to the present invention, can form, by crosslinking, a pressure-sensitive adhesive layer that particularly has excellent durability such that it does not cause lifting or separation upon heat treatment or treatment under high-humidity conditions even in the case of a pressure-sensitive adhesive layer having a reduced layer thickness.

Although not clear in detail, the reason why the pressure-sensitive adhesive composition can exhibit the above-described properties can be considered as described below. The (meth)acrylic polymer crosslinked by specific amounts of an isocyanate crosslinking agent and a peroxide has both a structure crosslinked by the peroxide (peroxide crosslinkage) and a structure crosslinked by the isocyanate crosslinking agent (isocyanate crosslinkage). Only one of the peroxide crosslinkage and the isocyanate crosslinkage cannot sufficiently exhibit the above-described properties. It is presumed that sufficient cohesive strength and the behavior of relaxing the stress applied to the pressure-sensitive adhesive can be produced at the same time only when a highly-relaxing, peroxide-crosslinked, main chain (peroxide crosslinkage) and a strong urethane bond formed by the isocyanate crosslinking agent (isocyanate crosslinkage) coexist in a well-balanced manner. In such a case, it is presumed that even when reduced in thickness, the pressure-sensitive adhesive layer can be highly durable so as not to cause lifting or separation upon heat treatment or treatment under high-humidity conditions.

According to the present invention, the (meth)acrylic polymer includes as monomer units: 50 to 98% by weight of a (meth)acrylic monomer represented by general formula $CH_2=C(R_1)COOR_2$, wherein $R_1$ is hydrogen or a methyl group, and $R_2$ is an alkyl group having 2 to 14 carbon atoms; and 0.1 to 35% by weight of a nitrogen-containing monomer. When such a polymer is used as a base polymer for the pressure-sensitive adhesive composition, a pressure-sensitive adhesive layer having well-balanced adhesion and durability can be obtained.

Although not clear in detail, the reason why the above-described properties can be exhibited using the nitrogen-containing monomer may be that the nitrogen-containing unit having high polarity and frequently existing in the polymer can increase the cohesive strength and the interaction with the surface of adherends. Carboxyl group-containing monomers or the like also have high polarity. However, if the content of such monomers is too high, the viscosity of the polymer solution can be too high due to an increase in hydrogen bond so that productivity can be reduced in some cases. In addition, the carboxyl group has strong acidity and thus can cause the erosion of adherends and substrates so that durability can be consequently reduced in some cases.

As used herein, the term "(meth)acrylic polymer" refers to an acrylic polymer and/or a methacrylic polymer, and the term "(meth)acrylate" refers to acrylate and/or methacrylate.

In an embodiment of the present invention, the nitrogen-containing monomer is intended to include a polymerizable monomer having at least one nitrogen atom in the monomer structure. For example, the nitrogen-containing monomer is preferably an imide group-containing monomer, an amide group-containing monomer, or the like.

The pressure-sensitive adhesive composition of the present invention contains 0.02 to 2 parts by weight of a peroxide, based on 100 parts by weight of the (meth)acrylic polymer.

The pressure-sensitive adhesive composition of the present invention also contains 0.02 to 2 parts by weight of an isocyanate crosslinking agent, based on 100 parts by weight of the (meth)acrylic polymer.

The isocyanate crosslinking agent of the present invention is intended to include an isocyanate compound having two or more isocyanate groups (including a functional group that is produced by temporary protection of an isocyanate group with a blocking agent or by oligomerization or the like and is convertible to the isocyanate group) in a single molecule.

The pressure-sensitive adhesive layer of the present invention is produced by crosslinking any one of the pressure-sensitive adhesive compositions defined above. Since the pressure-sensitive adhesive composition has the advantageous effect described above, the pressure-sensitive adhesive layer of the present invention produced by crosslinking the composition exhibits excellent pressure-sensitive adhesive properties and particularly has high durability such that it does not cause lifting or separation upon heat treatment or treatment under high-humidity conditions even in the case of a pressure-sensitive adhesive layer having a reduced layer thickness.

The pressure-sensitive adhesive layer preferably has a gel fraction of 45 to 95% by weight.

The pressure-sensitive adhesive layer preferably has a thickness of 1 to 15 μm. Even with such a reduced thickness, the pressure-sensitive adhesive layer of the present invention has high durability such that it does not cause lifting or separation when heat treatment or treatment under high-humidity conditions is performed.

The pressure-sensitive adhesive composition and the pressure-sensitive adhesive layer according to the present invention each having the advantageous effect described above are particularly suitable for use in optical members.

In another aspect, the pressure-sensitive adhesive layer of the present invention may be produced using a production process comprising the steps of forming a layer of the above-described pressure-sensitive adhesive compositions on one or both sides of a support and crosslinking the pressure-sensitive adhesive composition layer with the peroxide. The use of this process allows the production of a pressure-sensitive adhesive layer that exhibits pressure-sensitive adhesive properties described above and particularly has high durability such that it does not cause lifting or separation upon heat treatment or treatment under high-humidity conditions even in the case of a pressure-sensitive adhesive layer having a reduced layer thickness.

In an embodiment of the present invention, the step of crosslinking with the peroxide is intended to include the treatment of crosslinking the base polymer with radicals produced by thermal decomposition, photo-irradiation decomposition or the like of the peroxide. In the step of crosslinking with the peroxide, the peroxide is preferably decomposed by 50% by weight or more.

The pressure-sensitive adhesive layer produced by the process described above preferably has a gel fraction of 45 to 90% by weight.

The pressure-sensitive adhesive layer produced by the process described above preferably has a thickness of 1 to 15 μm. Even with such a reduced thickness, the pressure-sensitive adhesive layer produced by the above process has high durability such that it does not cause lifting or separation when heat treatment or treatment under high-humidity conditions is performed.

In a further aspect, the present invention provides an optical member with pressure-sensitive adhesive comprising an optical member and the above-described pressure-sensitive adhesive layer formed on one or both sides of the optical member. Since the pressure-sensitive adhesive layer has the advantageous effect described above, the optical member with pressure-sensitive adhesive exhibits excellent pressure-sensitive adhesive properties and particularly has high durability such that it does not cause lifting or separation upon heat treatment or treatment under high-humidity conditions even in the case of a pressure-sensitive adhesive layer having a reduced layer thickness.

In a further aspect, the present invention provides an image display, such as a liquid crystal display device, an organic electroluminescence (EL) display device, or a plasma display panel (PDP), including the above-described optical member with pressure-sensitive adhesive. The function of the image display is highly durable such that neither lifting nor separation occurs upon heat treatment or treatment under high-humidity conditions even in the case of a pressure-sensitive adhesive layer having a reduced layer thickness.

BRIEF DESCRIPTION OF THE DRAWING

FIG. 1 is a schematic diagram showing how to evaluate the durability of the examples and so on.

DESCRIPTION OF REFERENCE MARKS

| | |
|---|---|
| 10 | Polarizing plate |
| 12 | Pressure-sensitive adhesive layer (A) |
| 14 | Retardation film |
| 16 | Pressure-sensitive adhesive layer (B) |
| 18 | Glass |

BEST MODE FOR CARRYING OUT THE PRESENT INVENTION

Embodiments of the present invention are described in detail in the following.

The pressure-sensitive adhesive composition of the present invention comprises: 100 parts by weight of a (meth)acrylic polymer comprising as monomer units 50 to 98% by weight of a (meth)acrylic monomer represented by general formula $CH_2=C(R_1)COOR_2$, wherein $R_1$ is hydrogen or a methyl group, and $R_2$ is an alkyl group having 2 to 14 carbon atoms, and 0.1 to 35% by weight of a nitrogen-containing monomer; 0.02 to 2 parts by weight of a peroxide; and 0.02 to 2 parts by weight of an isocyanate crosslinking agent.

The present invention uses a (meth)acrylic polymer including as monomer units: 50 to 98% by weight of a (meth)acrylic monomer represented by general formula $CH_2=C(R_1)COOR_2$, wherein $R_1$ is hydrogen or a methyl group, and $R_2$ is an alkyl group having 2 to 14 carbon atoms; and 0.1 to 35% by weight of a nitrogen-containing monomer.

The (meth)acrylic polymer for use in the present invention includes, as a main component, a (meth)acrylic monomer represented by general formula $CH_2=C(R_1)COOR_2$, wherein $R_1$ is hydrogen or a methyl group, and $R_2$ is an alkyl group having 2 to 14 carbon atoms.

In the general formula, $R_1$ is hydrogen or a methyl group. In the general formula, $R_2$ is an alkyl group having 2 to 14 carbon atoms, preferably having 3 to 12 carbon atoms, more preferably having 4 to 9 carbon atoms. While the alkyl group represented by $R_2$ may be any of a straight chain and a branched chain, it is preferably a branched chain, because of its relatively low glass transition point.

Examples of the (meth)acrylic monomer represented by general formula $CH_2=C(R_1)COOR_2$ include ethyl(meth)acrylate, n-butyl(meth)acrylate, sec-butyl(meth)acrylate, tert-butyl(meth)acrylate, isobutyl(meth)acrylate, n-pentyl(meth)acrylate, isopentyl(meth)acrylate, hexyl(meth)acrylate, heptyl(meth)acrylate, isoamyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, isomyristyl(meth)acrylate, n-tridecyl(meth)acrylate, n-tetradecyl(meth)acrylate, stearyl(meth)acrylate, isostearyl(meth)acrylate, and phenoxyethyl(meth)acrylate. In particular, n-butyl(meth)acrylate and 2-ethylhexyl(meth)acrylate or the like are preferably used.

In an embodiment of the present invention, one or more (meth)acrylic monomer each represented by general formula $CH_2=C(R_1)COOR_2$ may be used singly or in combination of two or more. The content of the total of the (meth)acrylic monomer in all the monomers is from 50 to 98% by weight, preferably from 60 to 90% by weight, more preferably from 70 to 80% by weight. If the content of the (meth)acrylic monomer is too low, the adhesion can be undesirably low.

The (meth)acrylic polymer for use in the present invention includes 0.1 to 35% by weight, preferably 3 to 30% by weight, more preferably 5 to 25% by weight of a nitrogen-containing monomer as a monomer unit. If the content of the nitrogen-containing monomer is less than 0.1% by weight, there can be an adverse effect on adhesion or durability such that separation or the like can occur at high temperature or high humidity. If the content of the nitrogen-containing monomer is more than 35% by weight, adhesion can be low so that a problem can occur in which separation or a reduction in adhesion occurs at high temperature or high humidity.

The nitrogen-containing monomer is intended to include a polymerizable monomer containing at least one nitrogen atom in its monomer structure. Preferred examples thereof include imide group-containing monomers and amide group-containing monomers.

In particular, the nitrogen-containing monomer is preferably an amide group-containing monomer. When the amide group-containing monomer is used, the content of the amide group-containing monomer as a monomer unit is preferably from 3 to 15% by weight, more preferably from 5 to 10% by weight.

Examples of the imide group-containing monomers include N-cyclohexylmaleimide, N-phenylmaleimide, N-methylmaleimide, N-ethylmaleimide, N-propylmaleimide, N-isopropylmaleimide, N-butylmaleimide, and itaconimide.

Examples of the amide group-containing monomers include (meth)acrylamide, N,N-dimethyl(meth)acrylamide, N,N-diethyl(meth)acrylamide, N,N-diethylmethacrylamide, N-isopropyl(meth)acrylamide, N-methylol(meth)acrylamide, N-methoxymethyl(meth)acrylamide, N-butoxymethyl(meth)acrylamide, dimethylaminoethyl(meth)acrylate, tertbutylaminoethyl(meth)acrylate, diacetone(meth)acrylamide, N-vinylacetamide, N,N'-methylenebis(meth)acrylamide, N,N-dimethylaminopropyl(meth)acrylamide, and N-vinylcaprolactam.

Examples of other nitrogen-containing monomers include amino group-containing monomers, (meth)acrylonitrile, N-(meth)acryloylmorpholine, and N-vinyl-2-pyrrolidone.

In an embodiment of the present invention, any monomer other than the monomers described above, such as a polymerizable monomer for controlling the glass transition point or releasability of the (meth)acrylic polymer, may be used for the (meth)acrylic polymer, as long as the effects of the present invention are not reduced.

Examples of other polymerizable monomers that may be used as appropriate for the (meth)acrylic polymer of the present invention include cohesive strength or heat resistance enhancing components such as carboxyl group-containing monomers, sulfonic acid group-containing monomers, phosphoric acid group-containing monomers, vinyl ester monomers, and aromatic vinyl monomers; adhesive strength enhancing components or components with a functional group serving as a crosslinking point, such as acid anhydride group-containing monomers, hydroxyl group-containing monomers, epoxy group-containing monomers, and vinyl ether monomers; and (meth)acrylic monomers having an alkyl group with 15 or more carbon atoms. The monomer compounds may be used alone, or two or more thereof may be used in a mixture.

Examples of carboxyl group-containing monomers include acrylic acid, methacrylic acid, carboxyethyl(meth)acrylate, carboxypentyl(meth)acrylate, itaconic acid, maleic acid, fumaric acid, and crotonic acid. In particular, acrylic acid and methacrylic acid are preferably used.

Examples of sulfonic acid group-containing monomers include styrenesulfonic acid, allylsulfonic acid, 2-(meth)acrylamide-2-methylpropanesulfonic acid, (meth)acrylamidepropanesulfonic acid, sulfopropyl(meth)acrylate, and (meth)acryloyloxynaphthalenesulfonic acid.

Examples of phosphoric acid group-containing monomers include 2-hydroxyethylacryloyl phosphate.

Examples of vinyl ester monomers include vinyl acetate, vinyl propionate, vinyl laurate, and vinylpyrrolidone.

Examples of aromatic vinyl monomers include styrene, chlorostyrene, chloromethylstyrene, and α-methylstyrene.

Examples of acid anhydride group-containing monomers include maleic anhydride and itaconic anhydride.

Examples of hydroxyl group-containing monomers include 2-hydroxyethyl(meth)acrylate, 2-hydroxybutyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol(meth)acrylamide, N-hydroxy(meth)acrylamide, vinyl alcohol, allyl alcohol, 2-hydroxyethyl vinyl ether, 4-hydroxybutyl vinyl ether, and diethylene glycol monovinyl ether.

Examples of epoxy group-containing monomers include glycidyl(meth)acrylate and allyl glycidyl ether.

Examples of vinyl ether monomers include methyl vinyl ether, ethyl vinyl ether and isobutyl vinyl ether.

Examples of (meth)acrylic monomers having an alkyl group with one carbon atom or 15 or more carbon atoms include methyl(meth)acrylate, pentadecyl(meth)acrylate and hexadecyl(meth)acrylate.

The above other polymerizable monomers may be used alone, or two or more thereof may be used in a mixture. The total content of other monomers in all the monomers for the (meth)acrylic polymer is preferably from 0.1 to 10% by weight, more preferably from 0.3 to 7% by weight, still more preferably from 0.5 to 5% by weight.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

The silane monomer may be used alone, or two or more thereof may be used in a mixture. The total content of the silane monomer in all the monomers is preferably from 0.1 to 3 parts by weight, more preferably from 0.5 to 2 parts by weight, based on 100 parts by weight of the (meth)acrylic polymer. The silane monomer is preferably copolymerized in order to increase durability.

The (meth)acrylic polymer for use in the present invention preferably has a weight average molecular weight of 600,000 or more, more preferably of 1,600,000 to 3,000,000, still more preferably of 1,800,000 to 3,000,000. If the weight average molecular weight is less than 600,000, durability could be low in some cases. In view of workability, the weight average molecular weight is preferably 3,000,000 or less. The weight average molecular weight may refer to as a polystyrene-equivalent weight average molecular weight measured and calculated by gel permeation chromatography (GPC).

In order to provide well-balanced adhesive performance, the (meta)acrylic polymer preferably has a glass transition temperature (Tg) of −5° C. or lower, more preferably of −10° C. or lower. If the glass transition temperature is higher than −5° C., the polymer can less easily flow and can exhibit insufficient wetting performance on adherends so that interlayer swelling can occur. The glass transition temperature (Tg) of the (meth)acrylic polymer may be adjusted in the above range by appropriately changing the monomer components to be used or the composition ratio.

For the production of the (meth) acrylic polymer, any appropriate method may be selected from known production methods such as solution polymerization, bulk polymerization, emulsion polymerization, and various radical polymerization methods. The resulting (meth)acrylic polymer may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 8 to about 30 hours in the presence of a polymerization initiator such as azobisisobutylonitrile added in an amount of 0.01 to 0.2 parts by weight based on 100 parts by weight of the total of the monomers.

Any appropriate polymerization initiator, chain transfer agent, emulsifying agent and so on may be selected and used for radical polymerization.

Examples of the polymerization initiator used in the present invention include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by weight of the monomer.

In the polymerization in embodiment of the present invention, any chain transfer agent may also be used. The use of the chain transfer agent allows appropriate control of the molecular weight of the acrylic polymer.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol.

One of these chain transfer agents may be used alone, or two or more thereof may be used in a mixture. The total content of the chain transfer agent is preferably from about 0.01 to 0.1 parts by weight, based on 100 parts by weight of the monomer.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by Asahi Denka Kogyo K.K.). The reactive emulsifier is preferred, because after polymerization, it can be incorporated into a polymer chain to improve water resistance. Based on 100 parts by weight of the monomer, the emulsifier is preferably used in an amount of 0.3 to 5 parts by weight, more preferably of 0.5 to 1 parts by weight, in view of polymerization stability or mechanical stability.

The pressure-sensitive adhesive composition of the present invention includes the (meth)acrylic polymer as a base polymer.

The pressure-sensitive adhesive composition of the present invention also includes a peroxide and an isocyanate crosslinking agent.

In the present invention, any peroxide capable of generating active radical species by heating or photoirradiation and promoting the crosslinking of the base polymer in the pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used. If the one-minute half-life temperature is too low, the reaction can proceed during storage before coating and drying so that coating can be made impossible due to an increase in viscosity. On the other hand, if the one-minute half-life temperature is too high, the crosslinking reaction temperature can be high so that a side reaction can occur, or a large part of the peroxide can remain unreacted so that crosslinking can undesirably proceed over time in some cases.

Examples of the peroxide for use in the present invention include di(2-ethylhexyl)peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di (tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

The peroxide(s) may be used alone, or two or more thereof may be used in a mixture. The total content of the peroxide is preferably from 0.02 to 2 parts by weight, more preferably from 0.04 to 1.5 parts by weight, still more preferably from 0.05 to 1 part by weight, based on 100 parts by weight of the (meth)acrylic polymer. If the content is less than 0.02 parts by weight, crosslinking can be insufficient, and durability can be low in some cases. If the content is more than 2 parts by weight, crosslinking can be excessive, and adhesion can be low in some cases.

When the peroxide is used as a polymerization initiator, the peroxide residue without being used for the polymerization reaction may be used for the crosslinking reaction. In this case, the amount of the peroxide residue may be quantified, and if necessary, the peroxide may be added again to be used in a specific amount.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

Examples of the isocyanate crosslinking agent include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of the isocyanate crosslinking agent include lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (Coronate L (trade name) manufactured by Nippon Polyurethane Industry Co., Ltd), a trimethylolpropane-hexamethylene diisocyanate trimer adduct (Coronate HL (trade name) manufactured by Nippon Polyurethane Industry Co., Ltd) and an isocyanurate of hexamethylene diisocyanate (Coronate HX (trade name) manufactured by Nippon Polyurethane Industry Co., Ltd); polyether polyisocyanates and polyester polyisocyanates; adducts thereof with various polyols; and polyisocyanates polyfunctionalized with an isocyanurate bond, a biuret bond, an allophanate bond, or the like.

The isocyanate crosslinking agent(s) may be used alone, or two or more thereof may be used in a mixture. The total content of the isocyanate crosslinking agent(s) is preferably from 0.02 to 2 parts by weight, more preferably from 0.04 to 1.5 parts by weight, still more preferably from 0.05 to 1 part by weight, based on 100 parts by weight of the (meth)acrylic polymer. If the content is less than 0.02 parts by weight, cohesive strength can be insufficient in some cases. If the content is more than 2 parts by weight, adhesion can be further improved, but handleability can be limited in some cases generally with respect to the peroxide crosslinking when the totally balanced amount for controlling the degree of crosslinking is taken into account.

In an embodiment of the present invention, the amount of addition of the crosslinking agent (the peroxide and the isocyanate crosslinking agent) is preferably controlled such that the crosslinked pressure-sensitive adhesive layer can have a gel fraction of 45 to 95% by weight, more preferably 50 to 90% by weight, and still more preferably of 55 to 85% by weight. If the gel fraction is less than 45% by weight, cohesive strength can be reduced so that durability can be low in some cases. If the gel fraction is more than 95% by weight, adhesion can be low in some cases.

In an embodiment of the present invention, the gel fraction of the pressure-sensitive adhesive layer may be a value determined by a process including immersing a dry weight $W_1$ (g) of the pressure-sensitive adhesive layer in ethyl acetate, then taking the insoluble part of the pressure-sensitive adhesive layer out of the ethyl acetate, measuring the weight $W_2$ (g) thereof after drying, and calculating the value of $(W_2/W_1) \times 100$ as the gel fraction (% by weight).

More specifically, for example, $W_1$ (g) (about 500 mg) of the pressure-sensitive adhesive layer after the crosslinking is sampled and then immersed in ethyl acetate at about 23° C. for 7 days. The pressure-sensitive adhesive layer was then taken out and dried at 130° C. for 2 hours, and the weight $W_2$ (g) of the resulting pressure-sensitive adhesive layer is measured. $W_1$ and $W_2$ are used in the above formula to give the gel fraction (% by weight).

In order to adjust the gel fraction to a specific value, the amount of addition of the peroxide or the isocyanate crosslinking agent should be controlled, and the influence of the crosslinking temperature or the crosslinking time should also be fully taken into account.

For example, the crosslinking temperature or the crosslinking time is preferably controlled such that the peroxide in the pressure-sensitive adhesive composition can be decomposed by 50% by weight or more, more preferably by 60% by weight or more, still more preferably by 70% by weight or more. If the peroxide is decomposed by less than 50% by weight, the content of the peroxide residue in the pressure-sensitive adhesive composition can be relative high so that the crosslinking reaction can undesirably proceed with time even after the crosslinking process.

More specifically, for example, when the crosslinking process is performed at a one-minute half-life temperature, the peroxide is decomposed by 50% by weight in one minute, by 75% by weight in two minutes, and therefore, the crosslinking should be performed for a time period of one minute or more. For example, when the peroxide has a half life (half-value period) of 30 seconds at the crosslinking temperature, the crosslinking process should be performed for a time period of 30 seconds or more. For example, when the peroxide has a half life (half-value period) of 5 minutes or more at the crosslinking temperature, the crosslinking process should be performed for a time period of 5 minutes or more.

The crosslinking temperature or the crosslinking time may be theoretically calculated from the half life (half-value period) of the peroxide to be used, assuming that linear proportionality is established, and the amount of addition of the peroxide may be controlled as appropriate. Since side reactions can more likely occur at higher temperature, the crosslinking temperature is preferably 170° C. or lower.

The crosslinking process may be performed at the temperature of the step of drying the pressure-sensitive adhesive layer, or the crosslinking process may be separately performed after the drying process.

While the crosslinking time may be determined taking productivity or workability into account, it is generally from about 0.2 to about 20 minutes, preferably from about 0.5 to about 10 minutes.

A silane coupling agent may also be used for the pressure-sensitive adhesive composition for use in the present invention in order to increase adhesive strength or durability. Any appropriate known silane coupling agent may be used.

Examples of silane coupling agents include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane. Such silane coupling agents are preferably used to increase durability.

The silane coupling agent may be used alone, or two or more thereof may be used in a mixture. The total content of the silane coupling agent is preferably from 0.01 to 1 part by weight, more preferably from 0.02 to 0.6 parts by weight, still more preferably from 0.05 to 0.3 parts by weight, based on 100 parts by weight of the (meth)acrylic polymer. If the content is less than 0.01 parts by weight, durability can be low in some cases. If the content is more than 1 part by weight, adhesive strength to the optical member such as a liquid crystal cell can increase too much in some cases.

The pressure-sensitive adhesive composition of the present invention may also contain any other known additive. For example, a tackifier, a powder such as a colorant and a pigment, a dye, a surfactant, a plasticizer, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

The pressure-sensitive adhesive composition of the present invention has composition described above.

The pressure-sensitive adhesive layer of the present invention is produced by crosslinking the pressure-sensitive adhesive composition described above. The process of crosslinking the pressure-sensitive adhesive composition is generally performed after it is applied to the object. Alternatively, however, the pressure-sensitive adhesive layer may be formed by crosslinking the pressure-sensitive adhesive composition and then transferred to the support.

The pressure-sensitive adhesive layer may be formed on a support (such as an optical member or a separator) by any method. For example, the pressure-sensitive adhesive layer may be formed by a method that includes applying the pressure-sensitive adhesive composition to a release-treated separator or the like, removing a polymerization solvent and the like by drying, and transferring the pressure-sensitive adhesive layer onto the support, or by a method that includes applying the pressure-sensitive adhesive composition to the support and removing a polymerization solvent and the like by drying to form the pressure-sensitive adhesive layer on the support. When the pressure-sensitive adhesive composition is applied to the support to form an optical member with pressure-sensitive adhesive, one or more solvents other than the polymerization solvent may be further added to the composition such that it can be uniformly applied to the support.

Examples of the support for use in the present invention include a plastic substrate such as a polyethylene terephthalate (PET) film or a polyester film, a porous material such as a paper material or a nonwoven fabric, and an optical member.

Any plastic material formable into a sheet or a film may be used for the plastic substrate. Examples of the plastic substrate include films of polyolefins such as polyethylene, polypropylene, poly-1-butene, poly-4-methyl-1-pentene, ethylene-propylene copolymers, ethylene-1-butene copolymers, ethylene-vinyl acetate copolymers, ethylene-ethyl acrylate copolymers, and ethylene-vinyl alcohol copolymers; films of polyesters such as polyethylene terephthalate, polyethylene naphthalate and polybutylene terephthalate; polyacrylate films; polystyrene films; films of polyamides such as nylon 6, nylon 6,6 and partially-aromatic polyamides; polyvinyl chloride films; polyvinylidene chloride films; and polycarbonate films. The film generally has a thickness of 4 to 100 μm, preferably of about 4 to about 25 μm.

If necessary, the plastic substrate may be treated with a release agent such as a silicone, fluorine, long-chain alkyl, or fatty acid amide release agent, or may be subjected to release and antifouling treatment with silica powder or the like, adhesion facilitating treatment such as acid treatment, alkali treatment, primer treatment, corona treatment, plasma treatment, and ultraviolet treatment, or antistatic treatment of coating type, kneading and mixing type, vapor-deposition type, or the like.

Examples of such solvents for use in an embodiment of the present invention include methyl ethyl ketone, acetone, ethyl acetate, tetrahydrofuran, dioxane, cyclohexanone, n-hexane, toluene, xylene, methanol, ethanol, n-propanol, isopropanol, and water. The solvent may be used alone, or two or more thereof may be used in a mixture.

Known methods for the production of adhesive sheets may be used to form the pressure-sensitive adhesive layer of the present invention. Examples of such methods include roll coating, kiss roll coating, gravure coating, reverse coating, roll brush, spray coating, dip roll coating, bar coating, knife coating, air knife coating, curtain coating, lip coating, and extrusion coating with a die coater.

The pressure-sensitive adhesive layer of the present invention may be formed by a production method including the steps of forming a layer composed of any of the pressure-sensitive adhesive compositions described above on one or both sides of the support (such as an optical member or a separator) and crosslinking the pressure-sensitive adhesive composition layer with the peroxide. This process allows the production of pressure-sensitive adhesive layers that exhibit excellent pressure-sensitive adhesive properties as described above and have high durability such that they do not cause lifting or separation when heat treatment or treatment under high-humidity conditions is performed even in the case of a pressure-sensitive adhesive layer having a reduced layer thickness.

The surface of the pressure-sensitive adhesive layer may also be subjected to adhesion facilitating treatment such as corona treatment and plasma treatment.

When the pressure-sensitive adhesive is exposed on such a surface, the pressure-sensitive adhesive layer may be protected with a sheet (a release sheet, a separator or a release liner) having undergone release treatment, before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 μm, preferably from about 5 to about 100 μm.

If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

In the above production method, the release-treated sheet may be used without modification as a separator for the pressure-sensitive adhesive sheet, the optical member with pressure-sensitive adhesive or the like, so that the process can be simplified.

The pressure-sensitive adhesive layer produced by crosslinking the pressure-sensitive adhesive composition with the above crosslinking agent and the peroxide can be subjected to punching or slit processing immediately after a series of processes such as coating, drying, crosslinking, and transferring, in no need of aging or the like. Therefore, the pressure-sensitive adhesive layer has excellent productivity.

The pressure-sensitive adhesive layer preferably has a thickness of 1 to 15 µm, more preferably of 1 to 12 µm, still more preferably of 1 to 10 µm. Even with such a thickness smaller than the conventional thickness, the pressure-sensitive adhesive layer of the present invention has high durability such that it does not cause lifting or separation when heat treatment or treatment under high-humidity conditions is performed.

The pressure-sensitive adhesive composition and the pressure-sensitive adhesive layer according to the present invention produce advantageous effects as described above and therefore are particularly suitable for use in optical members.

In general, optical members can significantly expand or contract under hot or humid conditions, and such expansion or contraction increases the risk of lifting or separation. Thus, pressure-sensitive adhesive layers are required to have durability under such conditions. In order to solve this problem, conventional techniques include an attempt to increase the thickness (20 to 100 µm) of pressure-sensitive adhesive layers. However, it has been difficult for such conventional techniques to meet a recent demand for a reduction in the thickness of pressure-sensitive adhesive layers (for example, about 1 to 10 µm). The pressure-sensitive adhesive composition and the pressure-sensitive adhesive layer of the present invention can form both peroxide crosslinkage and isocyanate crosslinkage and therefore can have sufficient durability even on adherends significantly expandable or shrinkable under hot or humid conditions, such as optical members, and can be made thinner than the conventional thickness.

The optical member with pressure-sensitive adhesive of the present invention includes the optical member and the pressure-sensitive adhesive layer having the features described above and arranged on one or both sides of the optical member. In the optical member with pressure-sensitive adhesive of the present invention, the pressure-sensitive adhesive layer has the advantageous effect described above. Therefore, the optical member with pressure-sensitive adhesive of the present invention can exhibit excellent pressure-sensitive adhesive properties and have high durability such that they do not cause lifting or separation when heat treatment or treatment under high-humidity conditions is performed even in the case of a pressure-sensitive adhesive layer having a reduced layer thickness.

The optical member may be of any type for use in forming image displays such as liquid crystal displays. For example, a polarizing plate is exemplified as the optical member. A polarizing plate including a polarizer and a transparent protective film provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is about 1 to 500 μm, preferably 1 to 300 μm, especially 5 to 200 μm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: Rth=[(nx+ny)/(2−nz)]d, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. The polarizer and the protective film are bonded with an aqueous adhesive. The aqueous adhesive includes isocyanate based adhesives, polyvinyl alcohol based adhesives, gelatin based adhesives, vinyl based latex based, aqueous polyester based adhesives, and the likes.

As the opposite side of the polarizing-adhering surface of the transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the antireflection layer, sticking prevention layer, diffusion layer, anti glare layer, etc. may be built in the protective film itself, and also they may be prepared as an optical layer different from the protective film.

Further an optical member of the present invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical member, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the transparent protective film, on which a reflective layer of concavo-convex structure is prepared, may be mentioned. The reflective layer that has the fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without the coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from about 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The elliptically polarization plate and the reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical member, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bi-directional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the separated type polarization plate. Therefore, a polarization plate may be a reflection type elliptically polarization plate or a semi-transmission type elliptically polarization plate, etc. in which the reflection type polarization plate or a transflective type polarization plate is combined with above described retardation plate respectively.

Although an optical member with the above described optical layer laminated to the polarizing plate may be formed by a method in which laminating is separately carried out sequentially in manufacturing process of a liquid crystal display etc., an optical member in a form of being laminated beforehand has an outstanding advantage that it has excellent stability in quality and assembly workability, etc., and thus manufacturing processes ability of a liquid crystal display etc. may be raised. Proper adhesion means, such as a pressure-sensitive adhesive layer, may be used for laminating. On the occasion of adhesion of the above described polarizing plate and other optical layers, the optical axis may be set as a suitable configuration angle according to the target retardation characteristics etc.

In addition, ultraviolet absorbing property may be given to the each layer of the optical member and the pressure-sensitive adhesive layer etc. of the optical member with pressure-sensitive adhesive of the present invention, using a method of adding UV absorbents, such as salicylic acid ester type compounds, benzophenol type compounds, benzotriazol type compounds, cyano acrylate type compounds, and nickel complex salt type compounds.

The optical member with pressure-sensitive adhesive of the present invention is preferably used to form various types of image displays such as liquid crystal displays. Liquid crystal displays may be formed according to conventional techniques. Specifically, liquid crystal displays are generally formed by appropriately assembling a liquid crystal cell and the optical member with pressure-sensitive adhesive and optionally other component such as a lighting system and incorporating a driving circuit according to any conventional technique, except that the optical member of the present invention is used. Any type of liquid crystal cell may also be used such as a TN type, an STN type and a π type.

Suitable liquid crystal displays, such as liquid crystal display with which the optical member with pressure-sensitive adhesive has been located at one side or both sides of the liquid crystal cell, and with which a backlight or a reflective plate is used for a lighting system may be manufactured. In this case, the optical member may be installed in one side or both sides of the liquid crystal cell. When installing the optical members in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

The surface of such an optical member may be subjected to adhesion facilitating treatment such as corona treatment and plasma treatment or undercoating treatment such that the anchoring force of the optical member bonded to the pressure-sensitive adhesive layer can be increased.

The image display of the present invention may be a liquid crystal display, an organic electroluminescence (EL) display, a plasma display panel (PDP), or the like including the optical member with pressure-sensitive adhesive described above. The image display of the present invention particularly has excellent durability such that deterioration of the image display region can be suppressed even under severe conditions such as heating caused by lighting of backlight.

EXAMPLES

The features and effects of the present invention are more specifically described using some examples and so on. The evaluation items on the examples and so on were measured as described below.

<Molecular Weight Measurement>

The weight average molecular weight of the resulting (meth)acrylic polymer was measured by gel permeation chromatography (GPC) under the following conditions: analyzer, HLC-8120GPC manufactured by Tosoh Corporation; data processor, GPC-8020 manufactured by Tosoh Corporation; column, G7000H$_{XL}$-H+GMH$_{XL}$+GMH$_{XL}$ manufactured by Tosoh Corporation; column size, each 7.8 mmϕ×30 cm, 90 cm in total; flow rate, 0.8 ml/minute; injected sample concentration, about 0.1% by weight; injection volume, 100 μl; column temperature, 40° C.; eluent, tetrahydrofuran; detector, differential refractometer (RI). The molecular weight was determined as a polystyrene-equivalent molecular weight. The weight fraction (% by area) of polymers with molecular weights of 100,000 or less was calculated from the result of the GPC measurement with the data processor. In this process, monomer components were not included.

<Measurement of Amount of Decomposition of Peroxide>

The amount of decomposition of the peroxide after the thermal decomposition process was determined by high performance liquid chromatography (HPLC). Specifically, about 0.2 g samples were taken from the pressure-sensitive adhesive composition before and after the decomposition process, immersed in 10 ml of ethyl acetate, subjected to shaking extraction in a shaker at 25° C. and 120 rpm for 3 hours, and then allowed to stand at room temperature for 3 days. Ten ml of acetonitrile was then added thereto, and the mixture was shaken at 25° C. and 120 rpm for 30 minutes. About 10 μl of the extract obtained by filtration through a membrane filter (0.45 μm) was subjected to HPLC analysis by injection. The reduction of the peroxide amount from before to after the decomposition process was determined as the amount of decomposition of the peroxide. Analyzer, HPLCCPM/UV8000 manufactured by Tosoh Corporation; column, NUCLEOSIL 7C18 (4.6 mmϕ×250 mm) manufactured by MACHEREY-NAGEL; flow rate, 1 ml/minute; column pressure, 41 kg/cm$^2$; column temperature, 40° C.; eluent, water/acetonitrile=30/70; injection volume, 10 μl; injected sample concentration, 0.01% by weight; detector, UV detector (230 nm).

<Measurement of Gel Fraction>

W$_1$ g (about 0.1 g) of the pressure-sensitive adhesive layer prepared in each of the examples and the comparative examples was sampled and immersed in ethyl acetate at room temperature (about 25° C.) for one week. After the immersion, the pressure-sensitive adhesive layer sample (the insoluble matter) was taken out of ethyl acetate, dried at 130° C. for 2 hours and then weighed (W$_2$ g). The value calculated by the formula (W$_2$/W$_1$)×100 was determined as the gel fraction (% by weight).

<Measurement of Adhesive Strength>

The pressure-sensitive adhesive polarizing plate (25 mm in width) obtained in each of the examples and the comparative examples was bonded to a retardation film (Arton, a norbornene film, manufactured by JSR Corporation) by one reciprocation of a 2 kg roller. The polarizing plate was then autoclaved under 0.5 Mpa at 50° C. for 30 minutes. Thereafter, the polarizing plate was allowed to stand in an atmosphere at 23° C. and 50% RH for 3 hours and then measured for peel adhesive strength at a peel angle of 180° and a peel rate of 300 mm/minute.

<Durability Evaluation>

(Heat Resistance Test)

The prepared laminated sample (5 inches in size) was attached to an E-glass plate (Corning 1737 with a thickness of 0.7 mm manufactured by Corning Incorporated) and then autoclaved under 0.3 MPa at 50° C. for 15 minutes. Thereafter, the sample was stored in an atmosphere at 90° C. for 500 hours and then returned to room temperature (about 25° C.) to give a sample to be evaluated. In the heat resistance test, the evaluation was visually performed according to the following criteria:

○: Neither lifting nor separation occurred between the polarizing plate 10 and the retardation film 14
Δ: Lifting or separation slightly occurred between the polarizing plate 10 and the retardation film 14
x: Lifting or separation significantly occurred between the polarizing plate 10 and the retardation film 14

(Humidity Resistance Test)

The prepared laminated sample (5 inches in size) was attached to an E-glass plate (Corning 1737 with a thickness of 0.7 mm manufactured by Corning Incorporated) and then autoclaved under 0.3 MPa at 50° C. for 15 minutes. Thereafter, the sample was stored in an atmosphere at 60° C. and 95% RH for 500 hours and then returned to room temperature (about 25° C.) to give a sample to be evaluated. In the humidity resistance test, the evaluation was visually performed according to the following criteria:

○: Neither lifting nor separation occurred between the polarizing plate 10 and the retardation film 14
Δ: Lifting or separation slightly occurred between the polarizing plate 10 and the retardation film 14
x: Lifting or separation significantly occurred between the polarizing plate 10 and the retardation film 14

<Preparation of (Meth)Acrylic Polymers>

[Acrylic Polymer (a1)]

To a four-neck flask equipped with a stirring blade, a thermometer, a nitrogen gas introducing tube, and a condenser were added 77 parts by weight of butyl acrylate, 20 parts by weight of N-cyclohexylmaleimide (CMI), 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 58° C., so that a solution of an acrylic polymer (a1) was prepared. The acrylic polymer (a1) had a weight average molecular weight of 1,900,000.

[Acrylic Polymer (a2)]

To a four-neck flask equipped with a stirring blade, a thermometer, a nitrogen gas introducing tube, and a condenser were added 87 parts by weight of butyl acrylate, 10 parts by weight of N-cyclohexylmaleimide (CMI), 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 58° C., so that a solution of an acrylic polymer (a2) was prepared. The acrylic polymer (a2) had a weight average molecular weight of 1,800,000.

[Acrylic Polymer (a3)]

To a four-neck flask equipped with a stirring blade, a thermometer, a nitrogen gas introducing tube, and a condenser were added 92 parts by weight of butyl acrylate, 5 parts by weight of N-acryloylmorpholine (ACMO), 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 55° C., so that a solution of an acrylic polymer (a3) was prepared. The acrylic polymer (a3) had a weight average molecular weight of 1,780,000.

[Acrylic Polymer (a4)]

To a four-neck flask equipped with a stirring blade, a thermometer, a nitrogen gas introducing tube, and a condenser were added 30 parts by weight of 2-ethylhexyl acrylate, 52 parts by weight of butyl acrylate, 15 parts by weight of N,N-dimethylacrylamide (DMAA), 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 55° C., so that a solution of an acrylic polymer (a4) was prepared. The acrylic polymer (a4) had a weight average molecular weight of 1,910,000.

[Acrylic Polymer (a5)]

To a four-neck flask equipped with a stirring blade, a thermometer, a nitrogen gas introducing tube, and a condenser were added 67 parts by weight of butyl acrylate, 30 parts by weight of N-cyclohexylmaleimide, 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 55° C., so that a solution of an acrylic polymer (a5) was prepared. The acrylic polymer (a5) had a weight average molecular weight of 1,600,000.

[Acrylic Polymer (a6)]

To a four-neck flask equipped with a stirring blade, a thermometer, a nitrogen gas introducing tube, and a condenser were added 97 parts by weight of butyl acrylate, 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 55° C., so that a solution of an acrylic polymer (a6) was prepared. The acrylic polymer (a6) had a weight average molecular weight of 1,880,000.

[Acrylic Polymer (a7)]

To a four-neck flask equipped with a stirring blade, a thermometer, a nitrogen gas introducing tube, and a condenser were added 57 parts by weight of butyl acrylate, 40 parts by weight of N-cyclohexylmaleimide (CMI), 2.9 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 55° C., so that a solution of an acrylic polymer (a7) was prepared. The acrylic polymer (a7) had a weight average molecular weight of 1,980,000.

[Acrylic Polymer (a8)]

To a four-neck flask equipped with a stirring blade, a thermometer, a nitrogen gas introducing tube, and a condenser were added 82.9 parts by weight of butyl acrylate, 17 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 58° C., so that a solution of an acrylic polymer (a8) was prepared. The acrylic polymer (a8) had a weight average molecular weight of 1,880,000.

[Acrylic Polymer (b)]

To a four-neck flask equipped with a stirring blade, a thermometer, a nitrogen gas introducing tube, and a condenser were added 100 parts by weight of butyl acrylate, 5 parts by weight of acrylic acid, 0.1 parts by weight of 2-hydroxyethyl acrylate, 0.1 parts by weight of 2,2'-azobisisobutyronitrile as a polymerization initiator, and 200 parts by weight of ethyl acetate. Nitrogen gas was introduced to replace the air, while the mixture was gently stirred, and then a polymerization reaction was performed for 8 hours, while the temperature of the liquid in the flask was kept at about 55° C., so that a solution of an acrylic polymer (b) was prepared. The acrylic polymer (b) had a weight average molecular weight of 1,920,000.

Example 1

Preparation of Pressure-Sensitive Adhesive Layer (B)-Attached Retardation Film)

To the solution of the acrylic polymer (b), based on 100 parts by weight of the solids of the solution, was added 0.6 parts by weight of a polyisocyanate crosslinking agent including a trimethylolpropane-tolylene diisocyanate adduct as a crosslinking agent (Coronate L manufactured by Nippon Polyurethane Industry Co., Ltd.) so that an acrylic pressure-sensitive adhesive solution (b) was prepared.

The acrylic pressure-sensitive adhesive solution (b) was then applied to one side of a silicone-treated polyethylene terephthalate (PET) film (38 μm in thickness manufactured by Mitsubishi Polyester Film Corporation), dried at 130° C. for 3 minutes to form a pressure-sensitive adhesive layer (B), which had a thickness of 20 μm after drying.

The pressure-sensitive adhesive layer (B) was transferred to a retardation film (Arton, a norbornene film, manufactured by JSR Corporation) so that a pressure-sensitive adhesive layer (B)-attached retardation film was prepared.

(Preparation of Pressure-Sensitive Adhesive Layer (A1)-Attached Polarizing Plate)

To the solution of the acrylic polymer (a1), based on 100 parts by weight of the solids of the solution, were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (1) was prepared.

The acrylic pressure-sensitive adhesive solution (1) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A1), which had a thickness of 5 μm after drying. The pressure-sensitive adhesive layer (A1) had a gel fraction of 80% by weight. The amount of decomposition of the peroxide was 88% by weight after the drying.

The pressure-sensitive adhesive layer (A1) was transferred to a polarizing plate (SEG5224DU manufactured by Nitto Denko Corporation) so that a pressure-sensitive adhesive layer (A1)-attached polarizing plate was prepared.
(Preparation of Laminated Sample)

The pressure-sensitive adhesive layer side of the pressure-sensitive adhesive layer (A1)-attached polarizing plate was laminated to the side of the pressure-sensitive adhesive layer (B)-attached retardation film, which was opposite to the pressure-sensitive adhesive layer (B) side, so that a laminated sample of the polarizing plate and the retardation film was prepared.

Example 2

Preparation of Pressure-Sensitive Adhesive Layer (A2)-Attached Polarizing Plate)

To the solution of the acrylic polymer (a2), based on 100 parts by weight of the solids of the solution, were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (2) was prepared.

The acrylic pressure-sensitive adhesive solution (2) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A2), which had a thickness of 5 μm after drying. The pressure-sensitive adhesive layer (A2) had a gel fraction of 81% by weight. The amount of decomposition of the peroxide was 89% by weight after the drying.

The pressure-sensitive adhesive layer (A2) was transferred to a polarizing plate (SEG5224DU manufactured by Nitto Denko Corporation) so that a pressure-sensitive adhesive layer (A2)-attached polarizing plate was prepared.
(Preparation of Laminated Sample)

The pressure-sensitive adhesive layer side of the pressure-sensitive adhesive layer (A2)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Example 3

Preparation of Pressure-Sensitive Adhesive Layer (A3)-Attached Polarizing Plate)

To the solution of the acrylic polymer (a2), based on 100 parts by weight of the solids of the solution, were added 0.15 parts by weight of di(4-tert-butylcyclohexyl)peroxydicarbonate (with a half life of one minute at 92.1° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (3) was prepared.

The acrylic pressure-sensitive adhesive solution (3) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A3), which had a thickness of 5 μm after drying. The pressure-sensitive adhesive layer (A3) had a gel fraction of 83% by weight. The amount of decomposition of the peroxide was 91% by weight after the drying.

The pressure-sensitive adhesive layer (A3) was transferred to a polarizing plate (SEG5224DU manufactured by Nitto Denko Corporation) so that a pressure-sensitive adhesive layer (A3)-attached polarizing plate was prepared.
(Preparation of Laminated Sample)

The pressure-sensitive adhesive layer side of the pressure-sensitive adhesive layer (A3)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Example 4

Preparation of Pressure-Sensitive Adhesive Layer (A4)-Attached Polarizing Plate)

To the solution of the acrylic polymer (a3), based on 100 parts by weight of the solids of the solution, were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (4) was prepared.

The acrylic pressure-sensitive adhesive solution (4) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A4), which had a thickness of 5 μm after drying. The pressure-sensitive adhesive layer (A4) had a gel fraction of 82% by weight. The amount of decomposition of the peroxide was 89% by weight after the drying.

The pressure-sensitive adhesive layer (A4) was transferred to a polarizing plate (SEG5224DU manufactured by Nitto Denko Corporation) so that a pressure-sensitive adhesive layer (A4)-attached polarizing plate was prepared.

(Preparation of Laminated Sample)

The pressure-sensitive adhesive layer side of the pressure-sensitive adhesive layer (A4)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Example 5

Preparation of Pressure-Sensitive Adhesive Layer (A5)-Attached Polarizing Plate)

To the solution of the acrylic polymer (a4), based on 100 parts by weight of the solids of the solution, were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (5) was prepared.

The acrylic pressure-sensitive adhesive solution (5) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A5), which had a thickness of 5 μm after drying. The pressure-sensitive adhesive layer (A5) had a gel fraction of 76% by weight. The amount of decomposition of the peroxide was 84% by weight after the drying.

The pressure-sensitive adhesive layer (A5) was transferred to a polarizing plate (SEG5224DU manufactured by Nitto Denko Corporation) so that a pressure-sensitive adhesive layer (A5)-attached polarizing plate was prepared.
(Preparation of Laminated Sample)

The pressure-sensitive adhesive layer side of the pressure-sensitive adhesive layer (A5)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Example 6

Preparation of Pressure-Sensitive Adhesive Layer (A6)-Attached Polarizing Plate)

To the solution of the acrylic polymer (a5), based on 100 parts by weight of the solids of the solution, were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (6) was prepared.

The acrylic pressure-sensitive adhesive solution (6) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A6), which had a thickness of 5 μm after drying. The pressure-sensitive adhesive layer (A6) had a gel fraction of 85% by weight. The amount of decomposition of the peroxide was 83% by weight after the drying.

The pressure-sensitive adhesive layer (A6) was transferred to a polarizing plate (SEG5224DU manufactured by Nitto Denko Corporation) so that a pressure-sensitive adhesive layer (A6)-attached polarizing plate was prepared.
(Preparation of Laminated Sample)

The pressure-sensitive adhesive layer side of the pressure-sensitive adhesive layer (A6)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Comparative Example 1

Preparation of Pressure-Sensitive Adhesive Layer (A7)-Attached Polarizing Plate)

To the solution of the acrylic polymer (a6), based on 100 parts by weight of the solids of the solution, were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (7) was prepared.

The acrylic pressure-sensitive adhesive solution (7) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A7), which had a thickness of 5 μm after drying. The pressure-sensitive adhesive layer (A7) had a gel fraction of 82% by weight. The amount of decomposition of the peroxide was 89% by weight after the drying.

The pressure-sensitive adhesive layer (A7) was transferred to a polarizing plate (SEG5224DU manufactured by Nitto Denko Corporation) so that a pressure-sensitive adhesive layer (A7)-attached polarizing plate was prepared.
(Preparation of Laminated Sample)

The pressure-sensitive adhesive layer side of the pressure-sensitive adhesive layer (A7)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Comparative Example 2

Preparation of Pressure-Sensitive Adhesive Layer (A8)-Attached Polarizing Plate)

An acrylic pressure-sensitive adhesive solution (8) was prepared using the process of Comparative Example 1, except that dibenzoyl peroxide was not used.

The acrylic pressure-sensitive adhesive solution (8) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A8), which had a thickness of 5 μm after drying. The pressure-sensitive adhesive layer (A8) had a gel fraction of 76% by weight.

The pressure-sensitive adhesive layer (A8) was transferred to a polarizing plate (SEG5224DU manufactured by Nitto Denko Corporation) so that a pressure-sensitive adhesive layer (A8)-attached polarizing plate was prepared.

(Preparation of Laminated Sample)

The pressure-sensitive adhesive layer side of the pressure-sensitive adhesive layer (A8)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Comparative Example 3

Preparation of Pressure-Sensitive Adhesive Layer (A9)-Attached Polarizing Plate)

To the solution of the acrylic polymer (a7) (based on 100 parts by weight of the solids of the solution) were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (9) was prepared.

The acrylic pressure-sensitive adhesive solution (9) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A9), which had a thickness of 5 μm after drying. The pressure-sensitive adhesive layer (A9) had a gel fraction of 85% by weight. The amount of decomposition of the peroxide was 92% by weight after the drying.

The pressure-sensitive adhesive layer (A9) was transferred to a polarizing plate (SEG5224DU manufactured by Nitto Denko Corporation) so that a pressure-sensitive adhesive layer (A9)-attached polarizing plate was prepared.

(Preparation of Laminated Sample)

The pressure-sensitive adhesive layer side of the pressure-sensitive adhesive layer (A9)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Comparative Example 4

Preparation of Pressure-Sensitive Adhesive Layer (A10)-Attached Polarizing Plate)

An acrylic pressure-sensitive adhesive solution (10) was prepared using the process of Example 2, except that dibenzoyl peroxide was not used. The acrylic pressure-sensitive adhesive solution (10) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A10), which had a thickness of 5 μm after drying. The pressure-sensitive adhesive layer (A10) had a gel fraction of 70% by weight.

The pressure-sensitive adhesive layer (A10) was transferred to a polarizing plate (SEG5224DU manufactured by Nitto Denko Corporation) so that a pressure-sensitive adhesive layer (A10)-attached polarizing plate was prepared.

(Preparation of Laminated Sample)

The pressure-sensitive adhesive layer side of the pressure-sensitive adhesive layer (A10)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Comparative Example 5

Preparation of Pressure-Sensitive Adhesive Layer (A11)-Attached Polarizing Plate)

An acrylic pressure-sensitive adhesive solution (11) was prepared using the process of Example 2, except that the polyisocyanate crosslinking agent including the trimethylolpropane-tolylene diisocyanate adduct was not used.

The acrylic pressure-sensitive adhesive solution (11) was then applied to one side of a silicone-treated polyethylene terephthalate (PET) film (38 μm in thickness manufactured by Mitsubishi Polyester Film Corporation), dried and crosslinked at 150° C. for 3 minutes to form a pressure-sensitive adhesive layer (A11), which had a thickness of 5 μm after drying. The pressure-sensitive adhesive layer (A11) had a gel fraction of 72% by weight. The amount of decomposition of the peroxide was 84% by weight after the drying.

The pressure-sensitive adhesive layer (A11) was transferred to a polarizing plate (SEG5224DU manufactured by Nitto Denko Corporation) so that a pressure-sensitive adhesive layer (A11)-attached polarizing plate was prepared.

(Preparation of Laminated Sample)

The pressure-sensitive adhesive layer side of the pressure-sensitive adhesive layer (A11)-attached polarizing plate was laminated to the side of the pressure-sensitive adhesive layer (B)-attached retardation film prepared in Example 1, which was opposite to the pressure-sensitive adhesive layer (B) side, so that a laminated sample of the polarizing plate and the retardation film was prepared.

Comparative Example 6

Preparation of Pressure-Sensitive Adhesive Layer (A12)-Attached Polarizing Plate)

To the solution of the acrylic polymer (a8) (based on 100 parts by weight of the solids of the solution) were added 0.15 parts by weight of dibenzoyl peroxide (with a half life of one minute at 130° C.) acting as a crosslinking agent and 0.6 parts by weight of a polyisocyanate crosslinking agent including a trimethylolpropane-tolylene diisocyanate adduct (Coronate L manufactured by Nippon Polyurethane Industry Co., Ltd.) so that an acrylic pressure-sensitive adhesive solution (12) was prepared.

The acrylic pressure-sensitive adhesive solution (12) was then applied to one side of a silicone-treated polyethylene terephthalate (PET) film (38 μm in thickness manufactured by Mitsubishi Polyester Film Corporation), dried and crosslinked at 150° C. for 3 minutes. In this process, forming a pressure-sensitive adhesive layer (A12) which would have had a thickness of 5 μm after drying was attempted but failed, because the viscosity of the acrylic pressure-sensitive adhesive solution (12) was too high to form the pressure-sensitive adhesive layer (A12).

Durability evaluation (heat resistance test and humidity resistance test) and adhesive strength measurement were performed on each prepared laminated sample by the methods described above. The results are shown in Table 1.

TABLE 1

| | Type of Acrylic Polymer | Nitrogen-Containing Monomer | | Peroxide | | | Blending Amount of Isocyanate Crosslinking Agent (parts by weight) | Pressure-Sensitive Adhesive Layer (A) | | | Durability | |
|---|---|---|---|---|---|---|---|---|---|---|---|---|
| | | Type of Nitrogen-Containing Monomer | Content (wt %) | Type of Peroxide | Blending Amount (parts by weight) | Rate of Decomposition of Peroxide (wt %) | | Type of Pressure-Sensitive Adhesive Layer (A) | Thickness [μm] | Adhesive Strength [N/25 mm] | Heat Resistance Test [—] | Humidity Resistance Test [—] |
| Example 1 | a1 | CMI | 20 | Dibenzoyl Peroxide | 0.15 | 88 | 0.6 | A1 | 5 | 2.3 | ○ | ○ |
| Example 2 | a2 | CMI | 10 | Dibenzoyl Peroxide | 0.15 | 89 | 0.6 | A2 | 5 | 2.6 | ○ | ○ |
| Example 3 | a2 | CMI | 10 | Di(4-tert-butylcyclohexyl)peroxydicarbonate | 0.15 | 91 | 0.6 | A3 | 5 | 2.5 | ○ | ○ |
| Example 4 | a3 | ACMO | 5 | Dibenzoyl Peroxide | 0.15 | 89 | 0.6 | A4 | 5 | 2.3 | ○ | ○ |
| Example 5 | a4 | DMAA | 15 | Dibenzoyl Peroxide | 0.15 | 84 | 0.6 | A5 | 5 | 2.1 | ○ | ○ |
| Example 6 | a5 | CMI | 30 | Dibenzoyl Peroxide | 0.15 | 83 | 0.6 | A6 | 5 | 2.0 | ○ | ○ |
| Comparative Example 1 | a6 | — | — | Dibenzoyl Peroxide | 0.15 | 89 | 0.6 | A7 | 5 | 2.8 | ○ | Δ |
| Comparative Example 2 | a6 | — | — | — | — | — | 0.6 | A8 | 5 | 2.6 | x | x |
| Comparative Example 3 | a7 | CMI | 40 | Dibenzoyl Peroxide | 0.15 | 92 | 0.6 | A9 | 5 | 1.7 | x | x |
| Comparative Example 4 | a2 | CMI | 10 | — | — | — | 0.6 | A10 | 5 | 2.6 | x | x |
| Comparative Example 5 | a2 | CMI | 10 | Dibenzoyl Peroxide | 0.15 | 84 | — | A11 | 5 | 2.5 | x | x |
| Comparative Example 6 | a8 | — | — | Dibenzoyl Peroxide | 0.15 | 85 | 0.6 | A12 | 5 | —(*1) | —(*1) | —(*1) |

(*1) It was impossible to prepare a sample

As is evident from the results in Table 1, the laminated samples prepared according to the present invention (Examples 1 to 6) cause neither lifting nor separation in each of the heat resistance test and the humidity resistance test in all the examples and are highly durable to heat treatment and treatment under high-humidity conditions even in the case of a pressure-sensitive adhesive layer having a reduced layer thickness.

In all the comparative examples, however, the laminated samples not having the key feature of the present invention (Comparative Examples 1 to 6) cannot simultaneously achieve a reduction in the thickness of the pressure-sensitive adhesive layer and durability after high-temperature, treatment under high-humidity conditions, and have low durability, as compared with the case where the pressure-sensitive adhesive layer of the present invention is used, particularly in the case of a pressure-sensitive adhesive layer having a reduced layer thickness.

As is apparent from the above, the pressure-sensitive adhesive layer of the present invention exhibits excellent pressure-sensitive adhesive properties and has good durability such that it does not cause lifting or separation upon heat treatment or treatment under high-humidity conditions particularly even in the case of a pressure-sensitive adhesive layer having a reduced layer thickness.

The invention claimed is:

1. A pressure-sensitive adhesive layer, comprising a product produced by crosslinking a pressure-sensitive adhesive composition, wherein the pressure-sensitive adhesive composition is for use in optical members and is comprising:

100 parts by weight of a (meth)acrylic polymer comprising as monomer units 50 to 98% by weight of a (meth) acrylic monomer represented by general formula $CH_2=C(R_1)COOR_2$, wherein $R_1$ is hydrogen or a methyl group, and $R_2$ is an alkyl group having 2 to 14 carbon atoms, and 0.1 to 35% by weight of a nitrogen-containing monomer;

0.02 to 2 parts by weight of a peroxide as a crosslinking agent;

0.02 to 2 parts by weight of an isocyanate crosslinking agent; and an organic solvent, and wherein the pressure-sensitive adhesive layer has a gel fraction of 55 to 95% by weight.

2. The pressure-sensitive adhesive layer according to claim 1, wherein the nitrogen-containing monomer is an imide group-containing monomer and/or an amide group-containing monomer.

3. The pressure-sensitive adhesive layer according to claim 1, wherein the pressure-sensitive adhesive layer has a thickness of 1 to 15 μm.

4. An optical member with pressure-sensitive adhesive, comprising an optical member and the pressure-sensitive adhesive layer according to claim 1 formed on one or both sides of the optical member.

5. An image display, comprising at least one piece of the optical member with pressure-sensitive adhesive according to claim 4.

6. The pressure-sensitive adhesive layer according to claim 1, wherein the peroxide crosslinking agent is a peroxide with a one-minute half-life temperature of 80° C. to 160° C.

7. The pressure-sensitive adhesive layer according to claim 1, wherein the peroxide crosslinking agent is a peroxide with a one-minute half-life temperature of 90° C. to 140° C.

8. The pressure-sensitive adhesive layer according to claim 7, wherein the peroxide crosslinking agent is selected from the group consisting of di(2-ethylhexyl)peroxydicarbonate, di(4-tert-butylcyclohexyl)peroxydicarbonate, di-sec-butyl peroxydicarbonate, tert-butyl peroxyneodecanoate, tert-hexyl peroxypivalate, tert-butyl peroxypivalate, dilauroyl peroxide, di-n-octanoylperoxide, 1,1,3,3-tetramethylbutylperoxy-2-ethyl hexanoate, di(4-methylbenzoyl)peroxide, dibenzoyl peroxide, tert-butyl peroxyisobutylate, and 1,1-di (tert-hexylperoxy)cyclohexane.

9. The pressure-sensitive adhesive layer according to claim 7, wherein the peroxide crosslinking agent is selected from the group consisting of di(4-tert-butylcyclohexyl)peroxydicarbonate, dilauroyl peroxide, and dibenzoyl peroxide.

10. A process for producing a pressure-sensitive adhesive layer according to claim 1, comprising the steps of:

(i) forming a layer of a pressure-sensitive adhesive composition on one or both sides of a support, the pressure-sensitive adhesive composition being for use in optical members and comprising:

100 parts by weight of a (meth)acrylic polymer comprising as monomer units 50 to 98% by weight of a (meth) acrylic monomer represented by general formula $CH_7=C(R_1)COOR_2$, wherein $R_1$ is hydrogen or a methyl group, and $R_2$ is an alkyl group having 2 to 14 carbon atoms, and 0.1 to 35% by weight of a nitrogen-containing monomer, 0.02 to 2 parts by weight of a peroxide as a crosslinking agent, 0.02 to 2 parts by weight of an isocyanate crosslinking agent, and an organic solvent; and (ii) crosslinking the layer of the pressure-sensitive adhesive composition with the crosslinking agents.

11. The process according to claim 10, wherein the peroxide is decomposed by 50% by weight or more in the step of crosslinking with the peroxide.

12. The process according to claim 10, wherein the pressure-sensitive adhesive layer has a thickness of 1 to 15 μm.

* * * * *